(12) United States Patent
Zehner et al.

(10) Patent No.: US 6,366,887 B1
(45) Date of Patent: Apr. 2, 2002

(54) SIGNAL TRANSFORMATION FOR AURAL CLASSIFICATION

(75) Inventors: William J. Zehner, Lynn Haven, FL (US); R. Lee Thompson, Austin, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/005,936

(22) Filed: Jan. 12, 1998

Related U.S. Application Data

(63) Continuation-in-part of application No. 08/515,791, filed on Aug. 16, 1995, now abandoned.

(51) Int. Cl.$^7$ .............................................. G10L 13/06
(52) U.S. Cl. ...................................... 704/278; 704/267
(58) Field of Search ................................ 704/206, 260, 704/268, 200, 503, 500, 267, 271, 258; 84/645

(56) References Cited

U.S. PATENT DOCUMENTS

| | | | | |
|---|---|---|---|---|
| 4,209,843 A | * | 6/1980 | Hyatt | 708/422 |
| 4,435,832 A | * | 3/1984 | Asada et al. | 704/262 |
| 4,570,250 A | * | 2/1986 | Gabritsos et al. | 369/97 |
| 4,885,790 A | * | 12/1989 | McAulay et al. | 704/265 |
| 5,020,108 A | * | 5/1991 | Wason | 704/226 |
| 5,175,769 A | * | 12/1992 | Hejna, Jr. et al. | 704/211 |
| 5,479,564 A | * | 12/1995 | Vogten et al. | 704/267 |
| 5,611,002 A | * | 3/1997 | Vogten et al. | 704/267 |

OTHER PUBLICATIONS

Oppenheim and Schafer [Discrete–Time Signal Processing, 1989, pp 444–457].*
Frederic J. Harris, On the Use of Windows for Harmonic Analysis with the discrete Fourier Transform, Proc. IEEE, vol. 66, No. 1, pp. 51–83, Jan. 1978.*

* cited by examiner

*Primary Examiner*—William Korzuch
*Assistant Examiner*—Donald L. Storm
(74) *Attorney, Agent, or Firm*—Harvey A. Gilbert; Donald G. Peck

(57) ABSTRACT

A method transforms non-speech input signals into the temporal, spectral and redundancy patterns resembling that of human speech. A digital signal series $x_{ph}(n)$ is generated as a function of a non-speech analog input signal in accordance with $$X_{ph}(n) = \sum_{p=0}^{(N-1)/A} \sum_{m=0}^{L-1} x\left(\frac{pA+m}{f_s}\right) w(m)\delta(n-pL+m)$$

where N is the length of the input signal, L is the length of a windowed portion of the input signal, A is an offset between successively applied ones of the windowed portions, w(m) is a smoothing function simulating amplitude and structure of human speech phonemes, $f_s$ is a rate at which the input signal is sampled, and $\delta(n-pL+m)$ is a delta function that is equal to 1 for $(n-pL+m)=0$ and equal to 0 for $(n-pL+m)\neq 0$. The digital signal series is output to a device that presents its temporal, spectral and redundancy patterns.

10 Claims, 3 Drawing Sheets

2 PSEUDO-
PHONEMES
FROM SIGNAL
PORTION OF
SONAR ECHO

2 SPEECH
PHONEMES
OF "n"

SIGNAL TRANSFORMATION FOR AURAL CLASSIFICATION

This is a continuation-in-part of application Ser. No. 08/515,791 filed Aug. 16, 1995, now abandoned.

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The present invention relates to signal processing. In particular, the present invention relates to transforming an input signal (e.g., a sonar echo) so that the useful information (e.g., a target signature) embedded therein can be discriminated, detected, and classified using aural classification skills of the listener.

BACKGROUND OF THE INVENTION

The ability of echo-locating dolphins to discriminate shape, structure, and material of a submerged target has been demonstrated in the studies by Au and Hammer. See W. W. L. Au and C. E. Hammer, Target Recognition via Echolocation by Tursiops truncatus, in: *Animal Sonar Systems*, R. G. Busnel and J. F. Fish, ed, pg. 855–858, Plenum Press, New York, (1980) and C. E. Hammer, and W. W. L. Au, Porpoise Echo-Recognition: An Analysis of Controlling Target Characteristics, J. Acoust. Soc. Amer., 68, pg. 1285–1293 (1980). Human listeners have also been shown to possess this same ability in other studies. See J. F. Fish, C. S. Johnson and D. K. Ljungblad, Sonar Target Discrimination by Instrumented Human Divers, J. Acoust. Soc. Amer., 59, pg. 602–606 (1976); Advanced Resource Development Corporation, "The Use of Aural Processed Signals for Mine Detection and Classification," US Naval Air Command Report, Co. #N00019-85-C-0451, (1986); Advanced Resource Development Corporation, "An Interactive Neural Network System for Acoustic Signal Classification," Office of Naval Research Report, Co. #N00014-879-C-0237, (1990); and R. L. Thompson, "Aural Classification of Sonar Echoes," Electrical and Computer Engineering Report, U. T. at Austin Report, May 1995. In fact, human divers have been shown to equal or exceed the dolphins' abilities provided that certain operations are performed on the echo signals before they are presented to the diver. However, in previous efforts, the methods used to process echo signals have not been optimized for the natural listening processes of the human observer.

In the prior art, the techniques used to prepare echo signals for listener classification are: (1) to time shift the echo signal into the audible band of the listener or, (2) to heterodyne the echo signal up and then time shift the signal down into the audible band of the listener. These methods are limited to a narrow range of listening durations and are not designed to optimize the interface between the signal producing system and the human auditory classification system.

The human auditory classification system is based on phonemes. Phonemes are specific observable patterns of human speech, e.g., temporal, spectral, and redundancy patterns, which are operated upon by the natural speech-signal processing capabilities of the brain. It is reasonable to assume that during the interactive co-evolution of the speech and auditory systems, considerable adaptation has taken place to optimize a portion of the human auditory system for the classification of human speech using phonemes. The existing neural structures and learned behaviors used on a daily basis are assets that can be employed readily to perform signal processing aurally. These existing assets and skills have evolved in humans specifically for the purpose of extracting the details of words from noise.

One result of this coupled evolution of the auditory and speech systems is that the human auditory classification process is particularly robust in the presence of noise when the signal is speech. Thus, the human auditory system could be a very effective tool in a signal classification system based on human speech phonemes. However, active sonar systems typically use frequencies in the ultrasonic regions (above audible frequencies). This creates a frequency mismatch between the needs of a sonar system and the capabilities of the auditory system.

In sonar processing, classical techniques for overcoming the frequency mismatch problem include time stretching, modulation, or a combination of both to shift the sonar echo into the audible frequency range. Time stretching does not disrupt the harmonic structure of the signal. However, time stretching compresses the signal bandwidth and can underutilize the full bandwidth of the auditory system. On the other hand, modulation does not compress the signal bandwidth but does alter the harmonic structure.

Regardless of which classical approach is used, another more subtle problem still exists with the interface between the sonar and human ear. Sonar echoes generally do not sound like the signals for which the auditory classification system has been optimized, i.e., speech signals or phonemes. Thus, existing sonar processing techniques do not account for the inherent natural abilities of the human auditory classification system.

SUMMARY OF THE INVENTION

Accordingly, it is an object of the present invention to provide a method of processing an input signal to provide an output signal which permits the application of the existing neural structures and learned behaviors of human listeners.

Another object of the present invention is to provide a method of processing input signals of short duration into a new signal with extended duration that allows the natural speech-signal processes of the human brain to be applied to extract details of a target signal from noise.

Yet another object of the present invention is to provide a method of transforming a non-speech input signal such as a sonar echo signal into a signal having the temporal, spectral, and redundancy patterns of human speech.

These and other objects and advantages of the invention will be set forth in part in the description which follows, and will be apparent from the description, or may be learned by practice of the invention. The objects and advantages of the invention may be realized and attained by means of the instrumentalities and combinations particularly pointed out in the appended claims.

In accordance with the present invention, a method is provided to transform non-speech input signals into the temporal, spectral and redundancy patterns resembling that of human speech. A digital signal series $x_{ph}(n)$ is generated as a function of a non-speech analog input signal in accordance with $$X_{ph}(n) = \sum_{p=0}^{(N-1)/A} \sum_{m=0}^{L-1} x\left(\frac{pA+m}{f_s}\right) w(m)\delta(n-pL+m)$$

where n is the sample number of the next $X_{ph}$, N is the length of the input signal, L is the length of a windowed portion of the input signal, A is an offset between successively applied ones of the windowed portions, w(m) is a smoothing function simulating amplitude and structure of human speech phonemes, $f_s$ is a rate at which the input signal is sampled, and $\delta(n-pL+m)$ is a delta function that is equal to 1 for $(n-pL+m)=0$ and equal to 0 for $(n-pL+m)\neq 0$. The resulting digital signal series has temporal, spectral and redundancy patterns resembling that of human speech. The digital signal series is output to a device that presents the temporal, spectral and redundancy patterns of the digital signal series.

DETAILED DESCRIPTION OF THE INVENTION

The present invention is a method for transforming non-speech input signals into the temporal, spectral and redundancy patterns of human speech. By way of example, the present invention will be described relative to the transformation of a sonar-created echo. However, it is to be understood that the present invention could be applied to any non-speech signal that is or can be Nyquist sampled.

Figure 1:
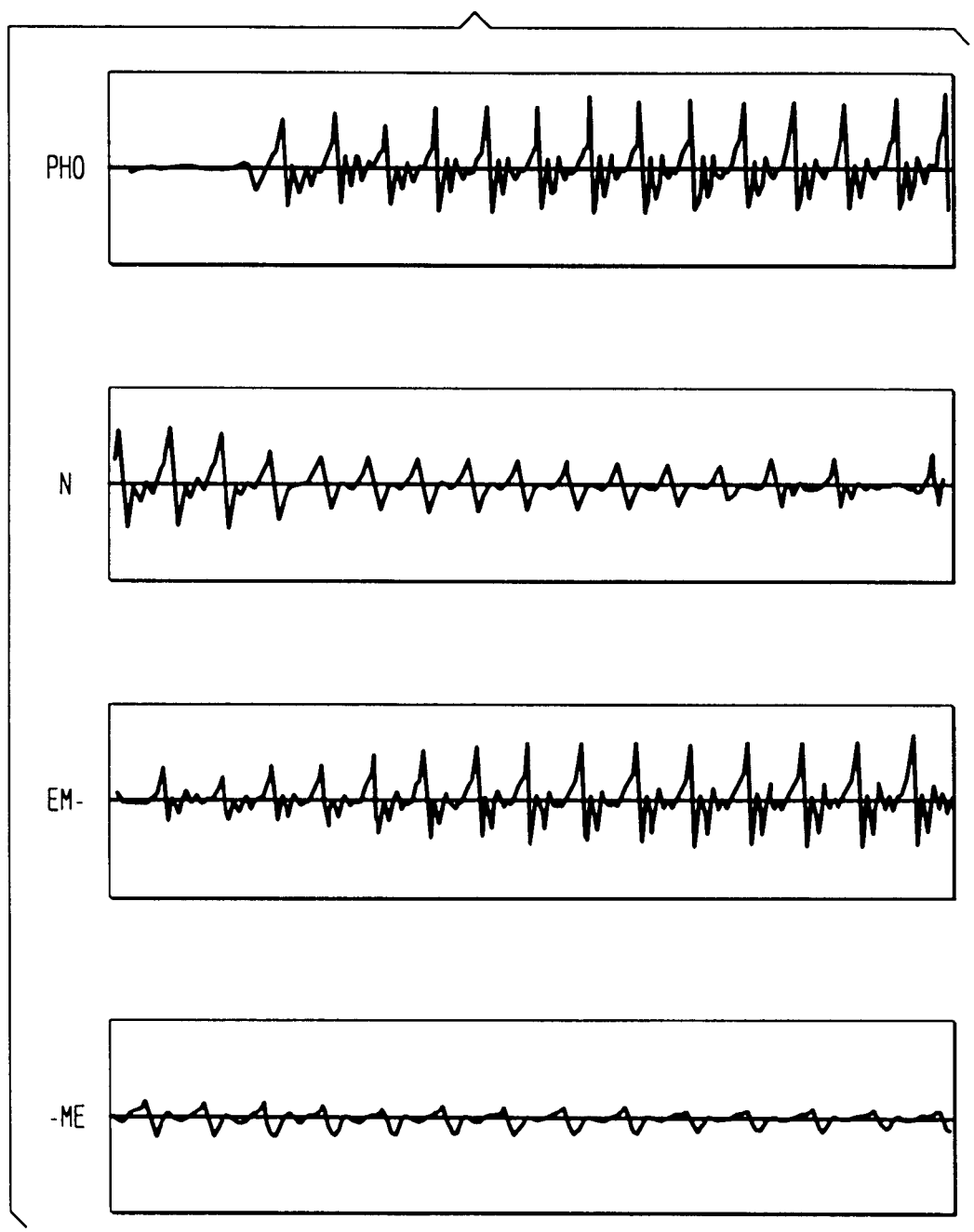
FIG. 1 depicts time series plots for the typical speech waveforms of the word "Phoneme"

It is reasonable to assume that considerable development and adaptation has taken place in the human auditory system to optimize a portion of the auditory system for the classification of human speech. Thus, there are a number of inferences that can be drawn about the human speech processor by examining the characteristics typical of speech. One primary inference is that the human speech classification system appears to benefit from redundancy. This follows from the fact that speech is organized into phonemes that are repeated a number of times before transitioning into the next series of phonemes. Each series of phonemes creates what the ear perceives as a vowel or consonant. For example, FIG. 1 shows time series plots of typical human speech waveforms representing the phonemes contributing to the word "Phoneme."

The redundancy in speech suggests that an integration or averaging process is taking place. Psychoacoustic studies corroborate this conclusion as measurement of the primary auditory nerve fiber's firing pattern indicates that there are averaging processes taking place in the auditory system. This conclusion can also be reached intuitively when one observes that slow speech (i.e., more redundancy) is more intelligible than fast speech. The recognition of this fact can be used to guide the design of the non-speech signal transformation technique of the present invention that takes advantage of the speech processing areas of the auditory system.

Other basic aspects of human speech that are factored into the present invention include the recognition that individual phonemes are typically from 5 to 10 ms long and that the transition between individual phonemes is a smooth process. There are also smooth transitions between the contents of a phoneme series (e.g., a vowel-to-consonant transition). Another important speech characteristic is that the majority of spectral energy in a typical speech signal is in the band between 200 Hz and 1000 Hz.

The present invention can be summarized as follows. A sonar echo or other non-speech input signal is processed in accordance with the characteristics of human speech. That is, a window of the sonar echo signal is transformed into a phoneme-like structure (or pseudo-phoneme as it will be referred to hereinafter). By doing this, the temporal pattern discrepancies between the sonar echo and speech are reduced.

The window is progressively moved through the sonar echo signal to create additional pseudo-phonemes that are sequentially appended to form a new signal. As the characteristics of the sonar echo signal change, the window content will change and the pseudo-phoneme content will change correspondingly. The amount of redundancy between the pseudo-phonemes is controlled by controlling the amount of offset between successive window applications. A graphical representation of the present invention is shown in FIG. 2.

Figure 2:
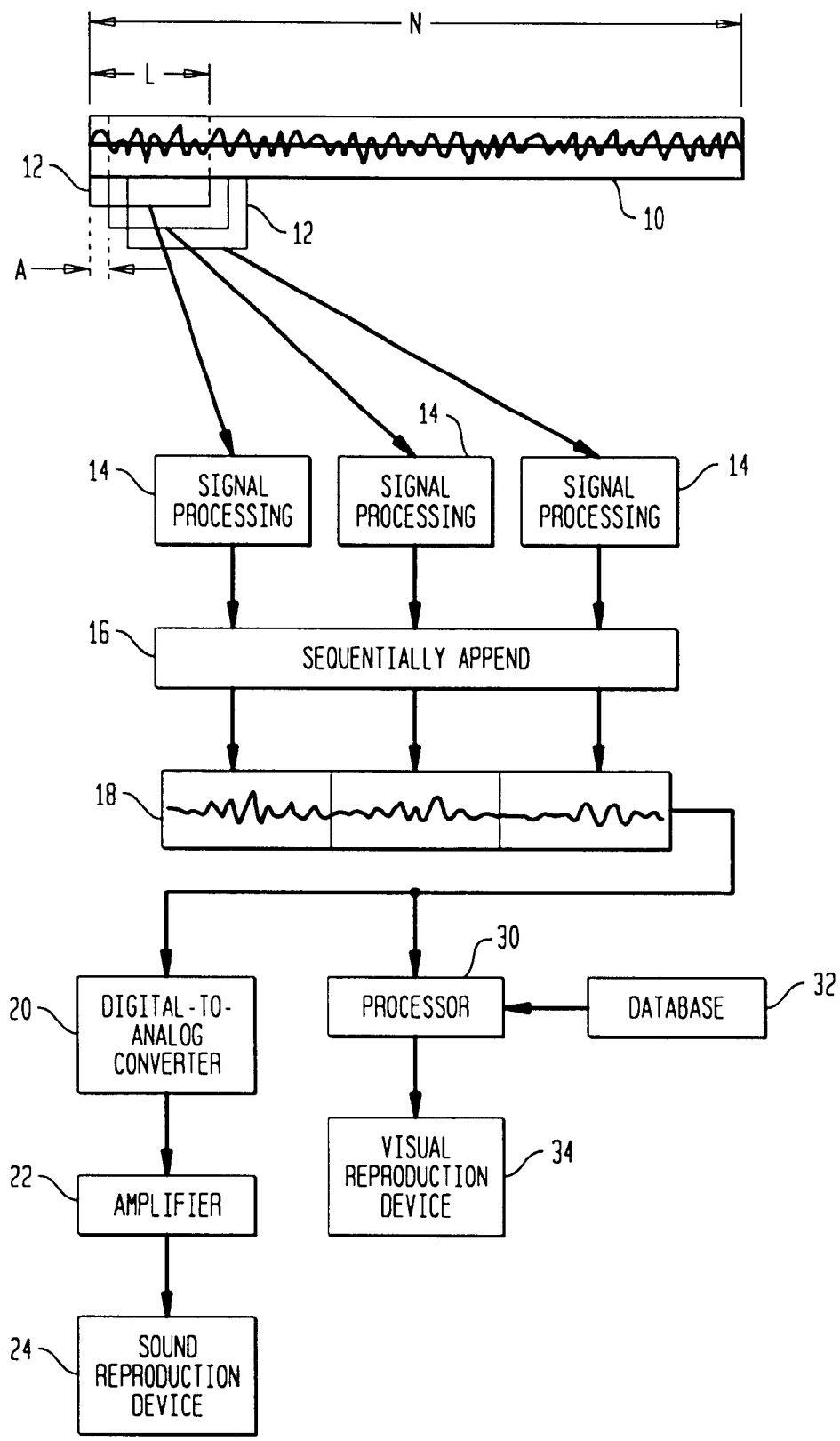
FIG. 2 is a graphical representation of the pseudo-phoneme method of the present invention.

In FIG. 2, an input signal of length N is depicted with windows 12 of length L being successively applied thereto in accordance with a specified offset A between successively applied windows 12. Although FIG. 2 is depicted as a sequential process, it is to be understood that the process could also be carried out in a parallel fashion.

Each windowed portion of input signal 10 is transformed at signal processing blocks 14 to form a pseudo-phoneme. At block 16, the pseudo-phonemes are sequentially appended to one another to form a new signal 18 having redundancy features similar to that of human speech. New signal 18 can be reproduced as an audio or visual output. For example, new signal 18 could be passed through a digital-to-analog converter 20 and amplifier 22 before being fed to a sound reproduction device 24 (e.g., speakers, headphones, etc.). New signal 18 could alternatively or simultaneously be passed to a processor 30 having a database 32 coupled thereto. Database 32 stores reference phoneme signals that are compared with new signal 18 at processor 30. A match during such comparison is then used to trigger an output at a visual reproduction device 34 (e.g., a CRT display, a printer, etc.). The visual output could include new signal 18 and the phoneme associated therewith in a fashion similar to that displayed in FIG. 1.

Analytically, the successive windowing, signal processing at block 14 and appending at block 16, can be expressed as a function of input signal 10. That is, new signal 18 or $X_{ph}$ (n) can be expressed analytically in terms of analog input signal 10 or x as $$X_{ph}(n) = \sum_{p=0}^{(N-1)/A} \sum_{m=0}^{L-1} x\left(\frac{pA+m}{f_s}\right) w(m)\delta(n-pL+m) \quad (1)$$

where n is the sample number of the next $X_{ph}$, w(m) is a smoothing function that simulates the amplitude and structure of human speech phonemes and reduces the edge effects (i.e., high frequency components) created at the transition between the individual pseudo-phonemes of new signal $X_{ph}$ (n), $f_s$ is the rate at which the analog input signal x is sampled, and $\delta(n-pL+m)$ is a delta function that samples the continuous signal x through impulse train modulation such that the delta function $\delta(n-pL+m)$ is equal to 0 except for the case $\delta(0)$ which is equal to 1. Examples of suitable smoothing functions include, but are not limited to, Hamming, Hanning, Kaiser, cosine, triangular, Blackman, Chebyshev, Bartlett, Rieman, Cauchy and Gaussian smoothing functions.

Figure 3A:
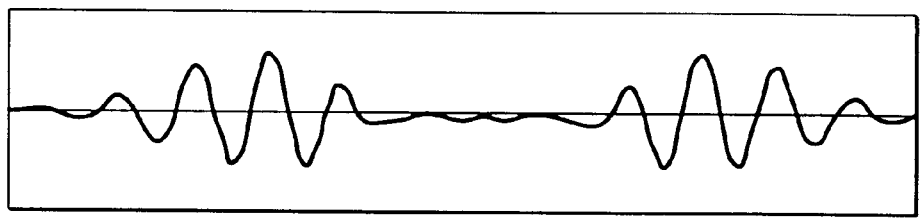
FIG. 3A depicts a time series plot of two pseudo-phonemes from the signal portion of sonar echo as generated by the present invention.
Figure 3B:
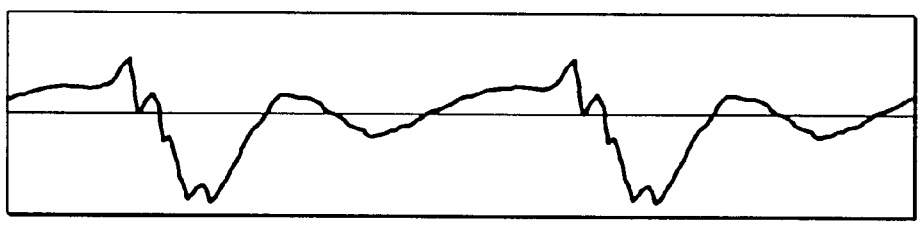
FIG. 3B depicts a time series plot of two human speech phonemes of the consonant "n".

By applying equation (1) to an analog, non-speech input signal, the present invention generates a new signal having the temporal, spectral and redundancy patterns of human speech. This result is evidenced in FIGS. 3A and 3B where FIG. 3A shows two pseudo-phonemes generated from a sonar echo signal by the present invention and FIG. 3B shows two human speech phonemes of the consonant "n".

For purpose of a more detailed description, the methodology embodied in equation (1) will be described as a stepwise sequential process. However, it is to be understood that the processing could also be carried out in a parallel fashion. Further, for simplicity, it is assumed that the continuous input signal x has been sampled and will be referenced below as xs. A window of the sampled input signal xs is defined in accordance with $$\sum_{m=0}^{L-1} xs(m_0+m)\delta(n-n_0+m) \quad (2)$$

where L is the length of the window, $m_0$ is the starting point (i.e., sample) of the window in the sampled input signal, n is the sample number in the new signal, $n_0$ is the starting point (i.e., sample) of the window in the new signal, and the delta function $\delta(n-n_0+m)$ is equal to 0 except for the case where $(n-n_0+m)=0$ when the delta function is equal to 1. Next, the re-defined window from equation (2) is processed by applying the smoothing function w(m) as follows $$\sum_{m=0}^{L-1} xs(m_0+m)\delta(n-n_0+m)w(m) \quad (3)$$

Finally, a set of the "smoothed" windows are created and appended together by redefining the starting point offsets in equation (2) as follows $$\sum_{p=0}^{N-1}\sum_{m=0}^{L-1} xs(pA+m)\delta(n-pL+m)w(m) \quad (4)$$

where N is the length of the sampled input signal and A is the offset between successively appended smoothed windows. Application of the smoothing function w(m) converts the characteristics of each non-speech input signal sample such that, when the "smoothed" samples are appended together as given by equation (4), a human-speech pseudo-phoneme signal is generated.

The present invention was implemented on a ZEOS 80486 IBM PC compatible computer apparatus with a clock speed of 66 MHz. The processing language used was MATLAB 4.0 running under the Windows 3.1 operating system. An appendix to this specification provides a program listing of the MATLAB 4.0 program used to carry out the present invention. The computer apparatus further included a Soundblaster 16ASP sound processing board and a pair of Sony MDR-004 stereo headphones for audio presentation of the pseudo-phoneme signals.

The advantages of the present invention are numerous. The method of the present invention transforms a non-speech input signal into the temporal, spectral, and redundancy characteristics of human speech so that the inherent classification skills and capabilities of the human speech processor can be applied to the classification of non-speech signals.

The present invention will be of great use in a variety of fields that require interpretation of non-speech signals. For example, sonar and radar systems can use the present invention to aid in the classification of targets at long ranges. There are also a variety of medical applications that can benefit from the present invention. For example, since the sonoelasticity of hard tumors is typically different than that of surrounding soft tissue, medical ultrasound could use the present invention to provide classification cues to a diagnostician during an examination. An electronic stethoscope could incorporate the present invention to aid a physician listening for subtle sounds associated with certain cardiac and respiratory disorders.

The present invention could also be used in acoustic vision systems for the blind. Currently, acoustic canes provide a blind user range information about nearby objects. If the acoustic cane incorporated the present invention, the blind user could also be provided with an acoustic vision of their environment, e.g., hard or soft, moving or non-moving, etc. The pseudo-phoneme information generated in accordance with the present invention could be fed to the user's ears thereby creating a set of acoustic "glasses".

Although the invention has been described relative to a specific embodiment thereof, there are numerous variations and modifications that will be readily apparent to those skilled in the art in the light of the above teachings. It is, therefore, to be understood that, within the scope of the appended claims, the invention may be practiced other than as specifically described.

APPENDIX
PHONWIN2.M

```
% Sliding Window Pseudo-phonemes
cd\matlab\listen\mdb
clear
load data0
data=data0;
nov1p=19;           %define overlap
nwin=22;            %window length
beg=130;            %set beginning of partition
ed=400;             %set end of partition
win=hanning(nwin);  %create weighting function
for t=1:27          %process all 27 signals
    plot (data(beg:ed,t));
    x=data(beg:ed,t);
    nx=length(x);
    nclo=fix((nx-novlp)/(nwin-novlp));
    y=zeros (nwin,ncol);
    %create signal shifted matrix
    colindex=1+(0: (ncol-1)) * (nwin-novlp);
    rowindex=(1:nwin)';
    y(:)=x(rowindex(:,ones(1,ncol)) + colindex(ones(nwin,1), :) -1);
    %apply window
    y(:)=win(:,ones(1,ncol)) .*y;
    %Shape into a single row;
    word(:,t)=reshape(y,ncol*nwin,1);
end
save word0 word novlp str nwin beg ed
```

What is claimed as new and desired to be secured by Letters Patent of the United States is:

1. A method of transforming non-speech input signals into the temporal, spectral and redundancy patterns resembling that of human speech, comprising the steps of:

providing an analog non-speech input signal x;
generating a digital signal series $x_{ph}(n)$ as a function of said input signal in accordance with $$X_{ph}(n) = \sum_{p=0}^{(N-1)/A} \sum_{m=0}^{L-1} x\left(\frac{pA+m}{f_s}\right) w(m)\delta(n-pL+m)$$

where n is the sample number of the next $X_{ph}$, N is the length of said input signal, L is the length of a windowed portion of said input signal, A is an offset between successively applied ones of said windowed portions, w(m) is a smoothing function simulating amplitude and structure of human speech phonemes, $f_s$ is a rate at which said input signal is sampled, and $\delta(n-pL+m)$ is a delta function that is equal to 1 for $(n-pL+m)=0$ and equal to 0 for $(n-pL+m)\neq 0$, wherein said digital signal series has temporal, spectral and redundancy patterns of human speech; and outputting said digital signal series using a device that presents said temporal, spectral and redundancy patterns of said digital signal series.

2. A method according to claim 1 further comprising the step of adjusting said offset to control said redundancy patterns of said digital signal series.

3. A method according to claim 1 wherein said step of generating is carried out sequentially.

4. A method according to claim 1 wherein said step of generating is carried out in parallel.

5. A method according to claim 1 wherein said smoothing function is selected from the group consisting of Hamming, Hanning, Kaiser, cosine, triangular, Blackman, Chebyshev, Bartlett, Rieman, Cauchy and Gaussian smoothing functions.

6. A method according to claim 1 wherein said step of outputting comprises the step of converting said digital signal series into an audible signal wherein said temporal, spectral and redundancy patterns of said digital signal series are exhibited.

7. A method of transforming non-speech input signals into the temporal, spectral and redundancy patterns resembling that of human speech, comprising the steps of:
providing an analog non-speech input signal x;
sampling said input signal to generate a digital input signal series xs (n);
transforming a windowed portion of said digital input signal series to form a portion of a new signal in accordance with $$\sum_{m=0}^{L-1} xs(m_0+m)\delta(n-n_0+m)w(m)$$

where L is the length of said windowed portion, $m_0$ is a starting point of said windowed portion relative to said digital input signal series, n is a sample number in said new signal, $n_0$ is a starting point of said portion of said new signal, $\delta(n-n_0+m)$ is a delta function that is equal to 1 for $(n-n_0+m)=0$ and equal to 0 for $(n-n_0+m)\neq 0$, and w(m) is a smoothing function simulating amplitude and structure of human speech phonemes;

creating and sequentially appending in a non-overlapping fashion each said portion of said new signal by redefining said starting point of said windowed portion for each said portion of said new signal, wherein said new signal is formed in its entirety in accordance with $$\sum_{p=0}^{N-1} \sum_{m=0}^{L-1} xs(pA+m)\delta(n-(pL+m))w(m)$$

where N is the length of said digital input signal series and A is an offset between successive ones of said windowed portion; and outputting said new signal using a device that presents temporal, spectral and redundancy patterns of said new signal.

8. A method according to claim 7 wherein said step of creating and appending comprises the step of adjusting said offset to control said redundancy patterns of said new signal.

9. A method according to claim 7 wherein said smoothing function is selected from the group consisting of Hamming, Hanning, Kaiser, cosine, triangular, Blackman, Chebyshev, Bartlett, Rieman, Cauchy and Gaussian smoothing functions.

10. A method according to claim 7 wherein said step of outputting comprises the step of converting said new signal into an audible signal wherein said temporal, spectral and redundancy patterns of said new signal are exhibited.

* * * * *